(12) United States Patent
Cho

(10) Patent No.: US 6,891,827 B2
(45) Date of Patent: May 10, 2005

(54) NETWORK-BASED TELEPHONY GATEWAY AND NETWORK-BASED TELEPHONY METHOD

(75) Inventor: Sung Bum Cho, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 356 days.

(21) Appl. No.: 09/898,825

(22) Filed: Jul. 3, 2001

(65) Prior Publication Data

US 2002/0080930 A1 Jun. 27, 2002

(30) Foreign Application Priority Data

Dec. 21, 2000 (KR) ......................................... 2000-79742

(51) Int. Cl.[7] .............................................. H04L 12/66
(52) U.S. Cl. ...................................... 370/356; 370/352
(58) Field of Search ................................. 370/351–356, 370/244, 401, 241; 379/90.01, 1.01, 14

(56) References Cited

U.S. PATENT DOCUMENTS

| 4,792,941 | A | * | 12/1988 | Yanosy et al. ............... 370/232 |
| 5,754,526 | A | * | 5/1998 | Kaneko et al. ............. 370/217 |
| 5,761,312 | A | * | 6/1998 | Zelikovitz et al. .......... 380/257 |
| 5,867,494 | A | * | 2/1999 | Krishnaswamy et al. ... 370/352 |
| 6,411,679 | B1 | * | 6/2002 | Khasnabish .................... 379/9 |
| 6,574,335 | B1 | * | 6/2003 | Kalmanek et al. .......... 379/386 |

* cited by examiner

Primary Examiner—Huy D. Vu
Assistant Examiner—Jason Mattis
(74) Attorney, Agent, or Firm—Lee, Hong, Degerman, Kang & Schmadeka, P.C.

(57) ABSTRACT

An Internet telephony gateway that connects a PSTN with an IP network and a method for operating the Internet telephony gateway are disclosed. When abnormal services due to matching between networks are interrupted, the Internet telephony gateway performs a flow for terminating a call with a corresponding subscriber terminal unit using an internal failure alarm system. The flow includes a message of a failure alarm, a tone, and an announcement.

20 Claims, 13 Drawing Sheets

FIG. 3A

| Add | b7~b4 | b3~b0 | Remarks |
|---|---|---|---|
| 0000<br>0001<br>0002<br>0003<br>0004<br>0005<br>0006<br>0007 (shelf) | DPM1 LC2<br>LC4<br>LC6<br>LC8<br>RDCC1<br><br>DKU3,4<br>PSU0,1 | DPM1 LC1<br>LC3<br>LC5<br>LC7<br>RDCC0<br>(HUBC)<br>DKU1,2<br>DKU5,6 | DKU,PSU : PSB_TB<br>conversion from<br>PSB-TB to PSB |
| 0008<br>0009<br>000a<br>000b<br>000c<br>000d<br>000e<br>000f (shelf) | DPM2 LC2<br>LC4<br>LC6<br>LC8<br>RDCC1<br><br>DKU3,4<br>PSU0,1 | DPM2 LC1<br>LC3<br>LC5<br>LC7<br>RDCC0<br>(HUBC)<br>DKU1,2<br>DKU5,6 | |
| 0010<br>0011<br>0012<br>0013<br>0014<br>0015<br>0016<br>0017 | DPM3 LC2<br>LC4<br>LC6<br>LC8<br>RDCC1<br><br>DKU3,4<br>PSU0,1 | DPM3 LC1<br>LC3<br>LC5<br>LC7<br>RDCC0<br>(HUBC)<br>DKU1,2<br>DKU5,6 | |

FIG. 3B

| Add | b7~b4 | b3~b0 | Remarks |
|---|---|---|---|
| 0018 | DPM4 LC2 | DPM4 LC1 | |
| 0019 | | | |
| 000a | LC4 | LC3 | |
| 000b | | | |
| 000c | LC6 | LC5 | |
| 000d | | | |
| 000e | LC8 | LC7 | |
| 000f | | | |
| | RDCC1 | RDCC0 (HUBC) | |
| | DKU3,4 | DKU1,2 | |
| | PSU0,1 | DKU5,6 | |
| 0020 | CPM NIC2 | CPM NIC1 | DKU,PSU : PSB_TB conversion from PSB-TB to PSB |
| 0021 | | | |
| 0022 | NIC4 | NIC3 | |
| 0023 | | | |
| 0024 | EIOC1 | EIOC0 | |
| 0025 | | | |
| 0026 | | | |
| 0027 | | | |
| | ASCC1 | ASCC0 | |
| | NSPC3 | NSPC2 | |
| | RDCC1 | RDCC0 | |
| | PSU0,1 | PSU1,2 | |

NETWORK-BASED TELEPHONY GATEWAY AND NETWORK-BASED TELEPHONY METHOD

CROSS REFERENCE TO RELATED ART

This application claims the benefit of Korean Patent Application No. 2000-79742, filed on Dec. 21, 2000, which is hereby incorporated by reference in its entirety.

BACKGROUND OF THE INVENTION

1. Field of the Invention

The present invention relates to an Internet telephony gateway and a method for operating an Internet telephony gateway.

2. Background of the Related Art

Generally, an Internet phone means interactive voice conversation between personal computer (PC) users through an Internet Protocol (IP) network in real time. Demand of the Internet phone is on an increasing trend owing to its inexpensive communication fees. The Internet phone is divided into a PC-to-PC type, a PC-to-phone type, and a phone-to-phone type depending on communication means.

Up to now, various examples of the PC-to-PC type and the PC-to-phone type have been developed.

Meanwhile, the PC-to-PC type transmits and receives voice data through a mike and a speaker by connecting corresponding PCs with each other. This PC-to-PC type is implemented in such a manner that both PCs access to an IP network at the same time. Analog voice signals received through the mike using one program are digitized between the PCs, and the digitized data are compressed to obtain packet data.

When the packet type voice data are transmitted to an opposing PC through the IP network, a corresponding PC restores the packet type voice data and outputs an original voice through the speaker. The PC-to-PC type that enables communication as above has a problem in that both PCs should be accessed to the IP network at the same time using one program.

Meanwhile, the PC-to-phone type is implemented in such a manner that after a predetermined program is installed in a corresponding PC, both a PC and a phone are accessed to the Internet and then linked to a public switched telephone network (PSTN) through an Internet telephony gateway installed in a specific area. Accordingly, the PC-to-phone type enables communication using a phone. However, the PC-to-phone type has a problem in that any one of the PC and the phone should be linked to the PSTN.

A related art Internet telephony gateway and a schematic network for Internet communication services will be described with reference to FIG. 1.

As shown in FIG. 1, a corresponding Internet telephony gateway 100 is linked to either a PSTN 50 or an IP network 60. Subscribers of either the PSTN 50 or the IP network 60 can perform communication through the IP network using terminal units such as phones and computers.

The Internet telephony gateway system 100 uses either an E1/T1 grade R2 signaling mode or a Link Access Protocol for D-channel (LAPD) signaling mode as a signaling mode for call control setup with the PSTN 50 or the IP network 60 linked thereto.

The R2 signaling mode also known as an ABCD signaling mode is operated by number 16 of a time slot in case of E1 grade. The LAPD signaling mode is to form packet data of signaling data with a D channel protocol of an Integrated Service Digital Network (ISDN) so as to control the packet type signaling data.

However, in the Internet telephony gateway 100, a point, where a defect is detected, is subject to the IP network 60 or the PSTN 50.

Therefore, the presence of any failure in the connection state between different networks is processed by time out due to polling. In this case, if any failure occurs in the PSTN 50, the abnormal state is maintained until a subscriber terminal unit of the IP network is restored by itself.

Meanwhile, if any failure occurs in the IP network 60, the abnormal state continues to remain until a subscriber terminal unit of the PSTN is restored by itself.

As described above, when one terminal unit is in failure state, the other terminal unit does not receive any notice thereof. A corresponding user of the other terminal unit is merely in standby state for a predetermined time. Moreover, the corresponding user must pay communication fees corresponding to the predetermined standby time. Accordingly, the related art causes subscribers loss in both time and economical aspects.

SUMMARY OF THE INVENTION

Accordingly, the present invention is directed to an Internet telephony gateway and a method for operating an Internet telephony gateway that substantially obviates one or more of the problems due to limitations and disadvantages of the related art.

An object of the present invention is to provide an Internet telephony gateway and a method for operating an Internet telephony gateway, in which abnormal services due to matching between networks can be prevented from being interrupted.

Another object of the present invention is to provide an Internet telephony gateway and a method for operating an Internet telephony gateway, in which interruption of abnormal services due to matching between different networks is provided to subscribers through a call termination sound using an internal alarm system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve these and other advantages and in accordance with the purpose of the present invention, as embodied and broadly described, an Internet telephony gateway accesses a call between a terminal unit for a PSTN and a terminal unit for an IP network. The Internet telephony gateway monitors states of the PSTN and the IP network through a monitoring board for the PSTN and a monitoring board for the IP network while it accesses the call. When any failure occurs in either the PSTN or the IP network, the Internet telephony gateway internally generates an alarm. Once the alarm occurs, the Internet telephony gateway directly performs a flow for normally terminating the call, with one, which is normally operating, between the terminal unit for the PSTN and the terminal unit for the IP network.

In the preferred embodiment of the present invention, the Internet telephony gateway checks states of the PSTN or the IP network in real time and performs a proper call processing with either the terminal unit for the PSTN or the terminal unit for the IP network, in which the failure does not occur.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein:

FIGS. 3A and 3B are diagrams showing address mapping of alarm data stored in a memory of FIG. 2;

DETAILED DESCRIPTION OF PREFERRED EMBODIMENTS

Reference will now be made in detail to the preferred embodiments of the present invention, examples of which are illustrated in the accompanying drawings.

Figure 1:
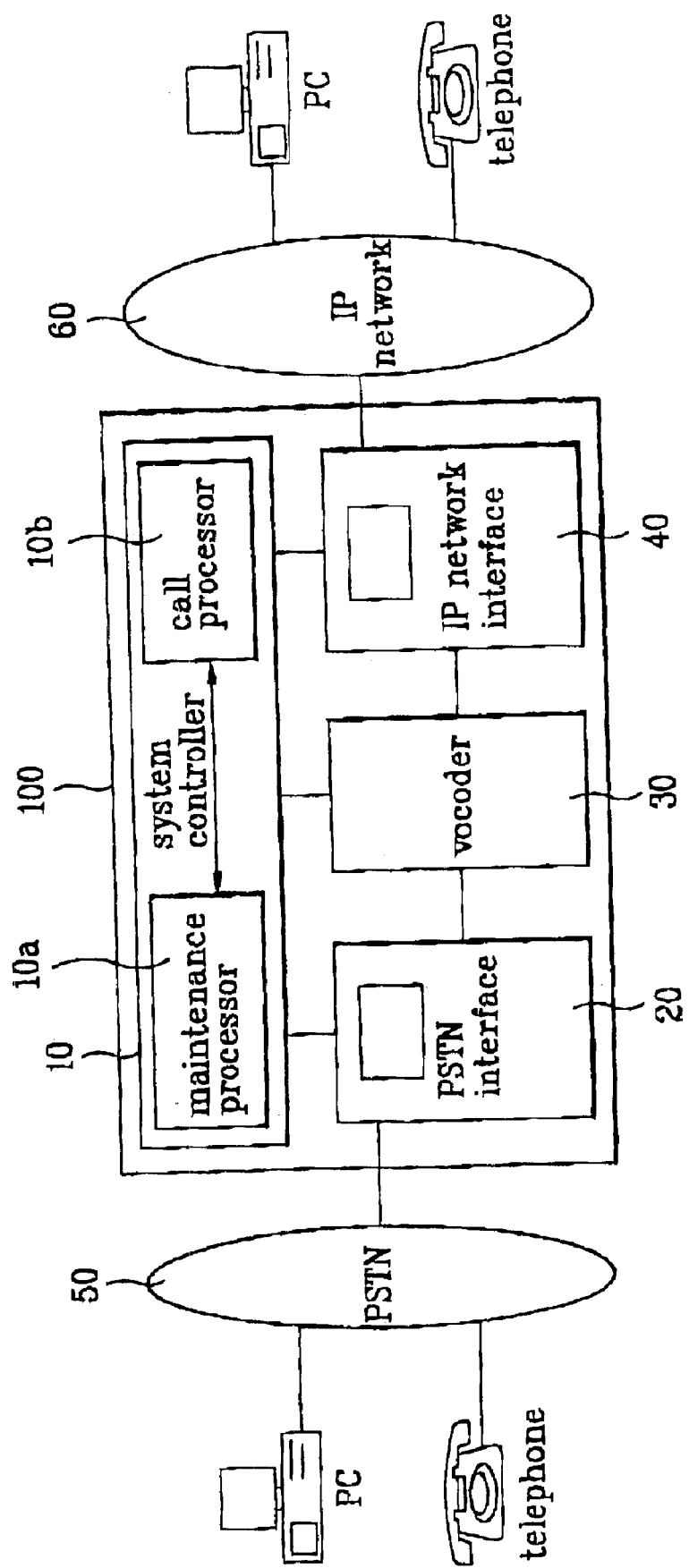
FIG. 1 is a diagram showing a configuration of a general Internet telephony gateway.

An Internet telephony gateway according to the present invention is similar to a general Internet telephony gateway of FIG. 1. Accordingly, a method for operating an Internet telephony gateway according to the present invention will be described with reference to FIG. 1.

As shown in FIG. 1, the Internet telephony gateway 100 includes a system controller 10, a PSTN interface 20, a vocoder 30, and an IP network interface 40.

The system controller 10 includes a maintenance processor 10a and a call processor 10b.

The maintenance processor 10a controls the state of a block matching a PSTN 50 with an IP network 60 outside the Internet telephony gateway 100 and controls the state of an internal system of the Internet telephony gateway 100.

In other words, the maintenance processor 10a controls ejection and injection of a board such as a printed circuit board assembly (PBA) for a block related to matching of the PSTN 50 in FIG. 1, normal data, abnormal data, and the connection state of physical LANs.

The call processor 10b processes a call of the Internet telephony gateway 100 and controls the state of channels.

In other words, the call processor lob matches the PSTN 50 with the IP network 60 and controls the state of channels for the call processing. The state of the channels includes the idle state, the conversation busy state, the block state, and the not-assign state. The call processor lob periodically updates the state of the channels according to maintenance data provided from the maintenance processor 10a.

In FIG. 1, the PSTN interface 20 interfaces the PSTN 50 with the Internet telephony gateway 100, and the IP network interface 40 interfaces the IP network 60 with the Internet telephony gateway 100.

In FIG. 1, the vocoder 30 compresses voice data of a pulse code modulation (PCM) type transmitted from the PSTN 50 in a predetermined packet type under the control of the system controller 10, and then transmits the compressed packet type voice data to the IP network 60 through the IP network interface 40. Alternatively, the vocoder 30 restores the packet type voice data received from the IP network 60 in a PCM type, and then transmits the restored voice data to the PSTN 50 through the PSTN interface 20.

Figure 2:
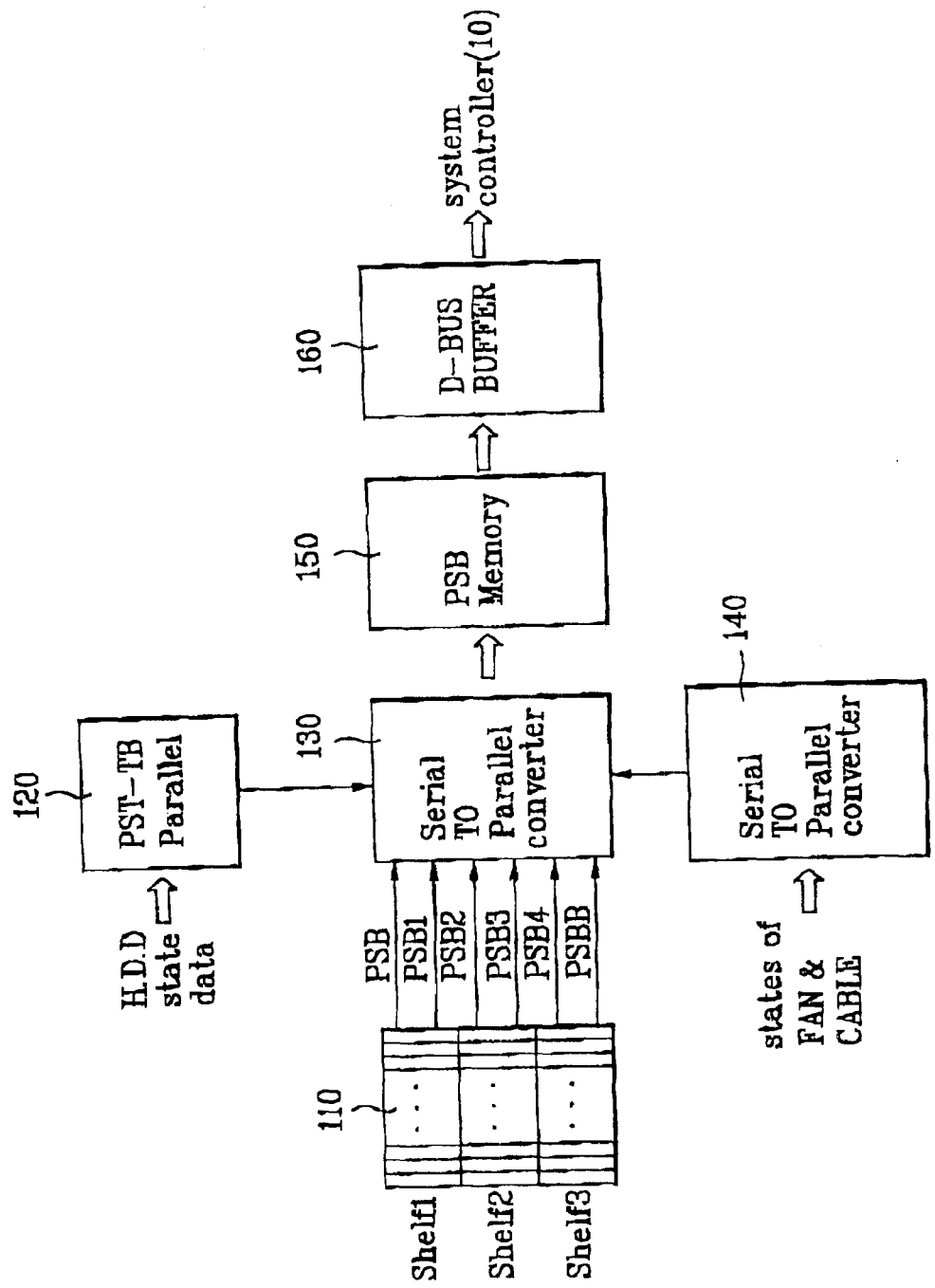
FIG. 2 is a block diagram showing a detailed configuration of a PSTN interface and an IP network interface in FIG. 1.

FIG. 2 is a block diagram showing a detailed configuration of the PSTN interface and the IP network interface in FIG. 1, and FIGS. 3A and 3B are diagrams showing address mapping of alarm data stored in a memory of FIG. 2.

When any failure occurs in the PSTN 50 and the IP network 60, paths of alarming and restoring the call will be described with reference to FIGS. 2, 3A and 3B.

As shown in FIG. 2, each of the PSTN interface 20 and the IP network interface 40 includes a printed board assembly (PBA) 110, a first parallel-to-serial converter 120, a second parallel-to-serial converter 140, a serial-to-parallel converter 130, a port scan bit (PSB) memory 150, and a data bus buffer 160. The PBA 110 provides state data of the PSTN 50 and the IP network 60. The first parallel-to-serial converter 120 converts state data of a hard disk drive (HDD) module to serial data. The second parallel-to-serial converter 140 converts parallel input state data of a fan and cables to serial data. The serial-to-parallel converter 130 converts the data from the first and second parallel-to-serial converters 120 and 140 to parallel data, and adds the parallel data to state data of ejection, injection, and operation of boards, input in parallel from the PBA 110. The PSB memory 150 stores the data output from the serial-to-parallel converter 130 in corresponding addresses. The data bus buffer 160 transmits the state data stored in the PSB memory 150 to the system controller 10 to monitor the failure.

Referring to FIG. 2, alarm data are collected in PSB and injection bit types from the PBA 110 when a failure corresponding to matching between the PSTN 50 and the IP network 60 occurs.

As shown in FIG. 2, the PSB is input to an alarm collecting PBA (not shown) of the PBA 110 as five kinds of independent signals; PSB(CPM), PSB1(DPM1: data processing module 1), PSB2(DPM2), PSB2(DPM3), PSB4 (DPM4), and SPSB(SPM).

The PSB (CPM) is used for the PSTN 50. The PSB1 (DMP1), PSB2(DMP2), PSB3(DPM3), and PSB4(DMP4) are used for the IP network 60.

The PSB includes the ejection state, the injection state, and the operation state of boards injected in a corresponding shelf of the PBA 110.

The data of the ejection state, the injection state, and the operation state in a hard disk module installed in each shelf are converted to signals of the PSB in a PSB-TB, and in turn are respectively collected in a PSB memory for each unit of group for the PSB signals corresponding to each shelf.

Meanwhile, the injection state data of the cables installed in the Internet telephony gateway 100 are input to the alarm collecting PBA of the PBA 110 in the injection bit type while the injection state data and the operation state data of the fan are input to the alarm collecting PBA of the PBA 110 in the injection bit type. Then, these state data of the cables and the fan are added to the PSB data, PSB(CPM), PSB1(DPM1), PSB2(DPM2), PSB3(DPM3), PSB4(DPM4), and SPSB (SPM) by the serial-to-parallel converter 130 through the second parallel-to-serial converter 140.

The collected alarm data are periodically stored in the PSB memory 150 in an 8-bit parallel type from the serial-to-parallel converter 130 under the control of system controller 10.

The alarm data for the PSTN correspond to the PSB in FIG. 2, and the real addresses in the memory 150 correspond to NIC1, NIC2, NIC3, and NIC4 of 0x20, 0x21 in FIG. 3B.

The NIC1 has a value of 0x00 in case of the normal state, while it has a value of 0x02 in case of alarm. However, the NIC1 has a value of 0x01 in case of ejection.

Meanwhile, the alarm data for the IP network correspond to the PSB1(DMP1), the PSB2(DMP2), the PSB3(DMP3), and PSB4(DMP4) in FIG. 2. However, their real addresses are 0x00–0x03, 0x08–0x0x09, 0x10–ox13, and 0x18–ox1b in FIGS. 3A and 3B, and are from LC1 to LC8 in each shelf.

In this case, the LC1 has a value of 0x00 in case of the normal state, the LC1 has a value of 0x02 in case of alarm, and the LC1 has a value of 0x01 in case of ejection.

Figure 4:
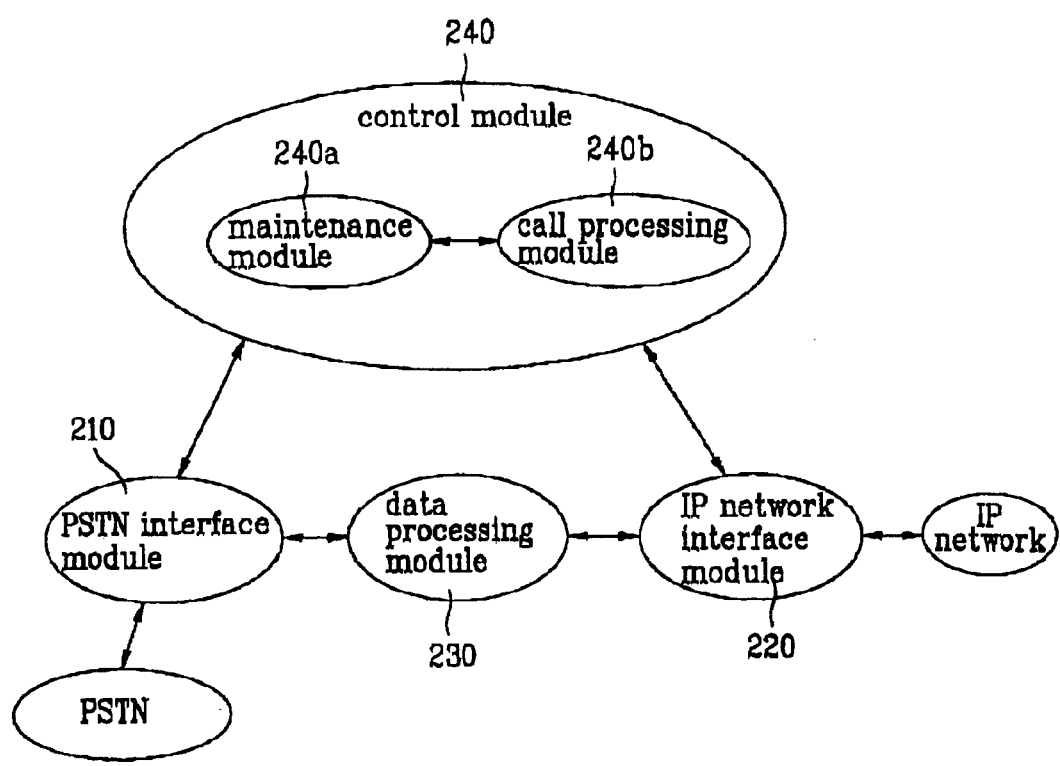
FIG. 4 is a block diagram showing configuration modules of an Internet telephony gateway according software of the present invention.

FIG. 4 is a block diagram showing a configuration of the Internet telephony gateway according to software of the present invention.

The Internet telephony gateway in FIG. 4 includes a PSTN interface module 210, an IP network interface module 220, a data processing module 230, and a control module 240. The PSTN interface module 210 is in interface with the PSTN and generates a failure alarm when a failure occurs in the PSTN. The IP network interface module 220 is in interface with the IP network and generates a failure alarm when a failure occurs in the IP network. The data processing module 230 performs a data processing procedure required for data exchange between the PSTN and the IP network.

In response to the failure alarm that may occur in either the PSTN or the IP network, the control module 240 performs a flow that enables a corresponding subscriber to normally terminate a call through the other network in which a failure alarm has not occurred.

The control module 240 includes a maintenance module 240a and a call processing module 240b. The maintenance module 240a manages the state of a block, which matches the PSTN with the IP network, and manages the inner state of the Internet telephony gateway.

The call processing module 240b matches the PSTN with the IP network and manages the states of channels for the call processing, and updates the states of the channels according to maintenance data provided by the maintenance module.

Figure 5:
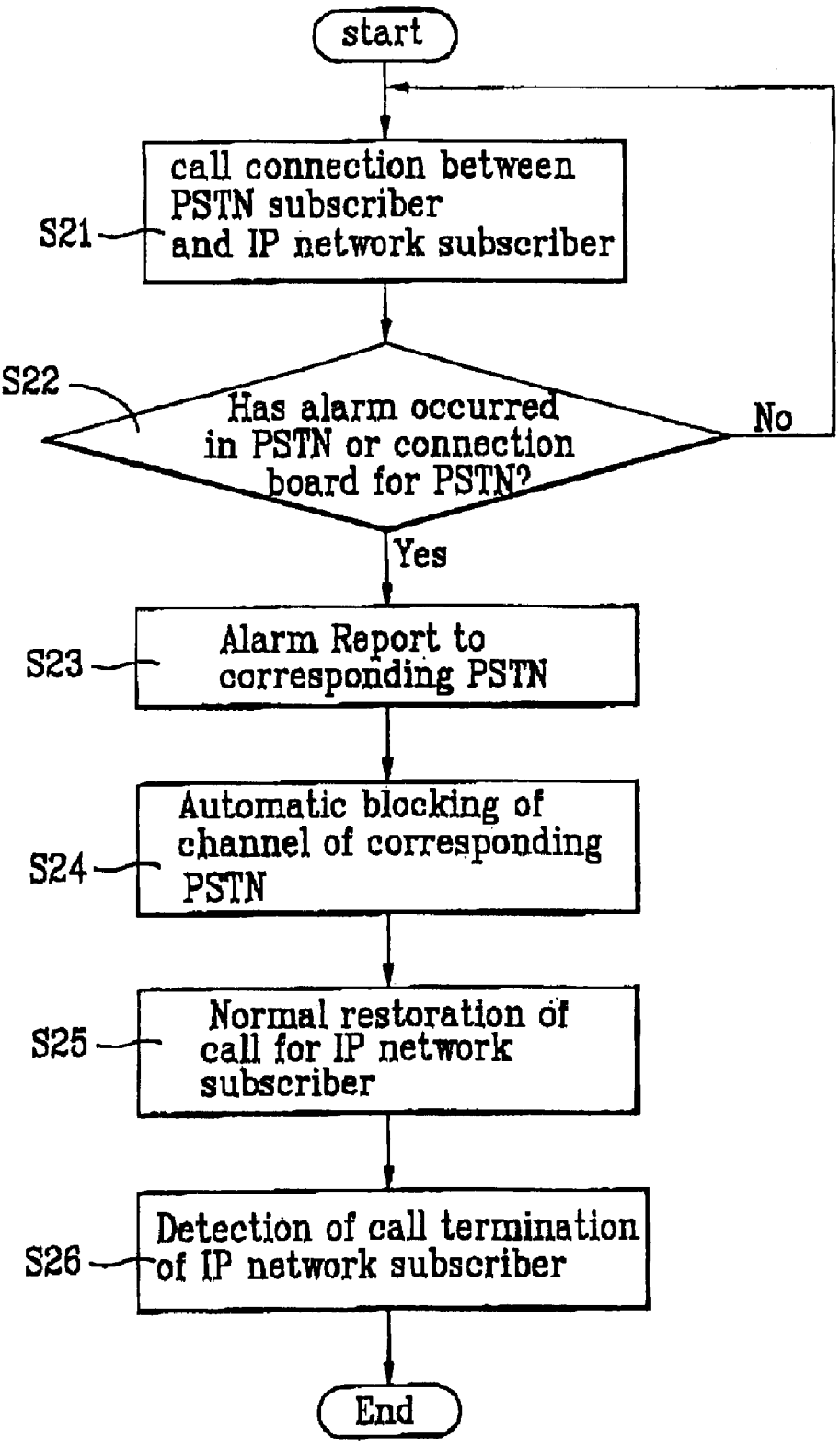
FIG. 5 is a flow chart showing a method for operating the Internet telephony gateway when any failure occurs in the PSTN in accordance with the first embodiment of the present invention.

When any failure occurs in the PSTN, a method for operating the Internet telephony gateway according to the first embodiment of the present invention will now be described with reference to a flow chart of FIG. 5.

First, a call connection between a subscriber terminal unit for the PSTN 50 and a subscriber terminal unit for the IP network 60 is attempted (S21). Then, when a failure occurs in the PSTN 50, the system controller 10 determines, according to the information written in the PSB memory 150, whether an alarm has occurred in the PSTN 50 itself and a connecting board related to the PSTN 50 of the PBA 110 (S22).

Types of the failure include synchronization fail with the PSTN 50, channel lock, the abnormal state due to a trunk matching hardware and software fail inside the Internet telephony gateway 100, and ejection of the PBA.

When it is determined that a failure occurred in either the PSTN 50 itself or the related board of the PSTN 50, the PBA 110 reports the failure alarm of the channels within the PSTN 50 to the maintenance processor 10a inside the system controller 10 of the Internet telephony gateway 100 (S23).

Subsequently, after a corresponding channel of PSTN 50 has been blocked (S24), the system controller 10 restores the call of the terminal unit for the IP network (S25).

The above step (S25) performs the same message flow as that the subscriber terminal unit for the PSTN 50 performs to normally terminate a call.

As described above, once the IP network 60 is restored, abnormal states, such as call failure, do not occur in the corresponding terminal unit for the IP network and the Internet telephony gateway 100 provides the terminal unit for the IP network with a sound that indicates the termination of the call (S26). The sound includes a call termination message, a tone, and an announcement. Therefore, with the sound, the corresponding terminal for the IP network is able to acknowledge the termination of the call.

Figure 6:
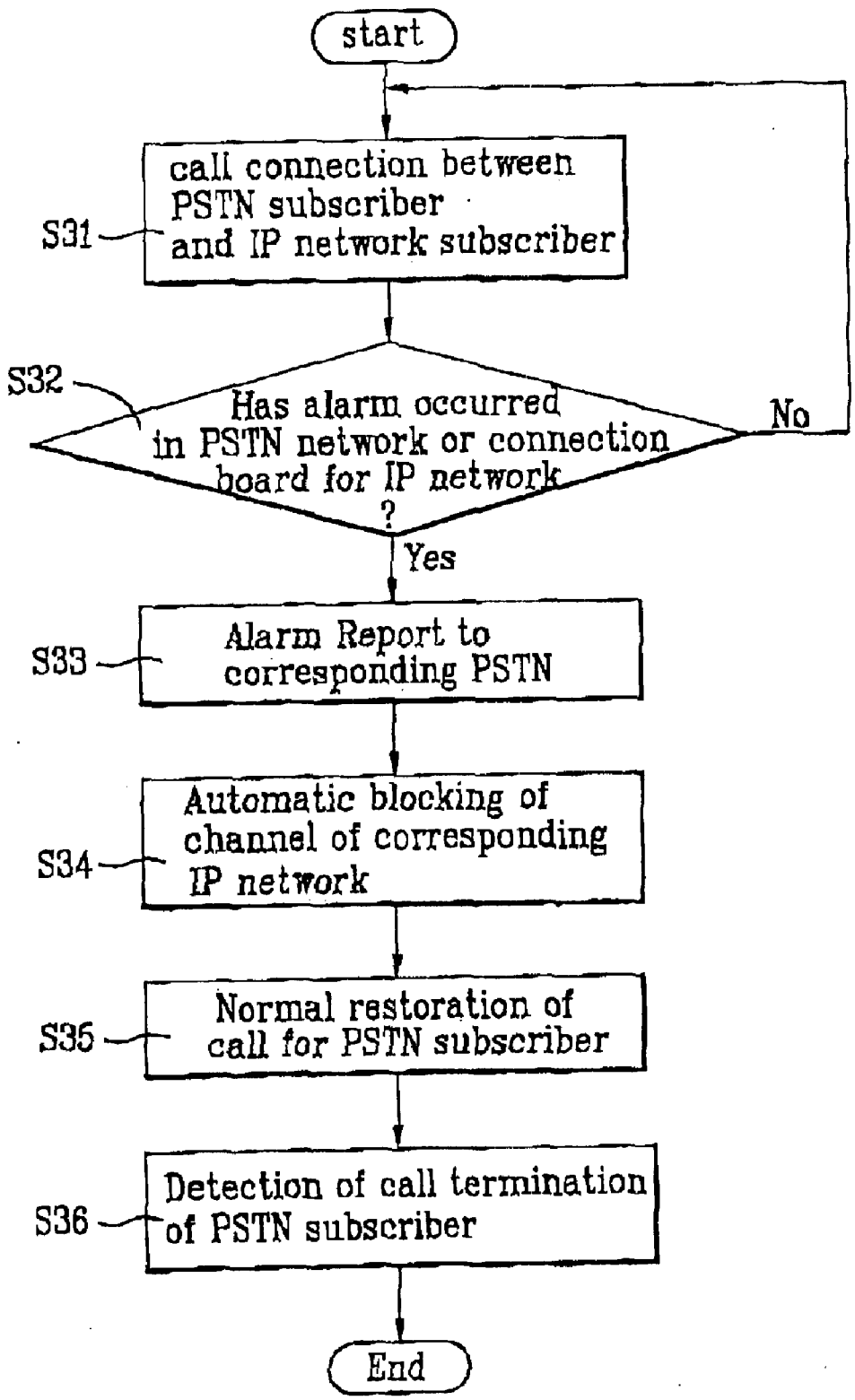
FIG. 6 is a flow chart showing a method for operating the Internet telephony gateway when any failure occurs in the IP network in accordance with the second embodiment of the present invention.

When any failure occurs in the IP network 60, a method for operating an Internet telephony gateway according to the second embodiment of the present invention will be described with reference to a flow chart of FIG. 6.

First, call connection between a subscriber terminal unit for the PSTN 50 and a subscriber terminal unit for the IP network 60 is attempted (S31). Subsequently, the system controller 10 determines, based on data written in the PSB memory 150, whether a failure alarm has occurred in the IP network 60 of the PBA 110 and a connecting board of IP network 60 (S32).

Types of the failure include poor connection between the IP network 60 and the PSTN 50, the abnormal state due to an IP matching hardware and software fail inside the Internet telephony gateway 100, and ejection of the PBA 110.

If it is determined that the failure alarm occurs in either the IP network 60 or the connecting board corresponding to the IP network 60, the PBA 110 reports the failure alarm on a corresponding channel of the IP network 60 to the maintenance processor 10a within the system controller 10 of the Internet telephony gateway 100 (S33).

Subsequently, after blocking the corresponding channel of the IP network 60 (S34), the system controller 10 restores the call of the subscriber terminal unit for the PSTN 50 (S34).

In the step S34, the same message flow as that performed when the subscriber terminal unit for the IP network normally terminates the call is performed.

As described above, if the PSTN 50 is restored, not the abnormal state such as call failure occurs in the corresponding terminal unit for the PSTN but sound for informing termination of the call is provided from the Internet telephony gateway 100 to the corresponding terminal unit for the PSTN (S36). The sound includes a call termination message, a tone, and an announcement.

Therefore, the corresponding terminal unit for the IP network detects termination of the call through the sound.

Procedures of setting and releasing a call between PSTNs using the Internet telephony gateway will briefly be described with reference to FIGS. 7 to 12.

Figure 7:
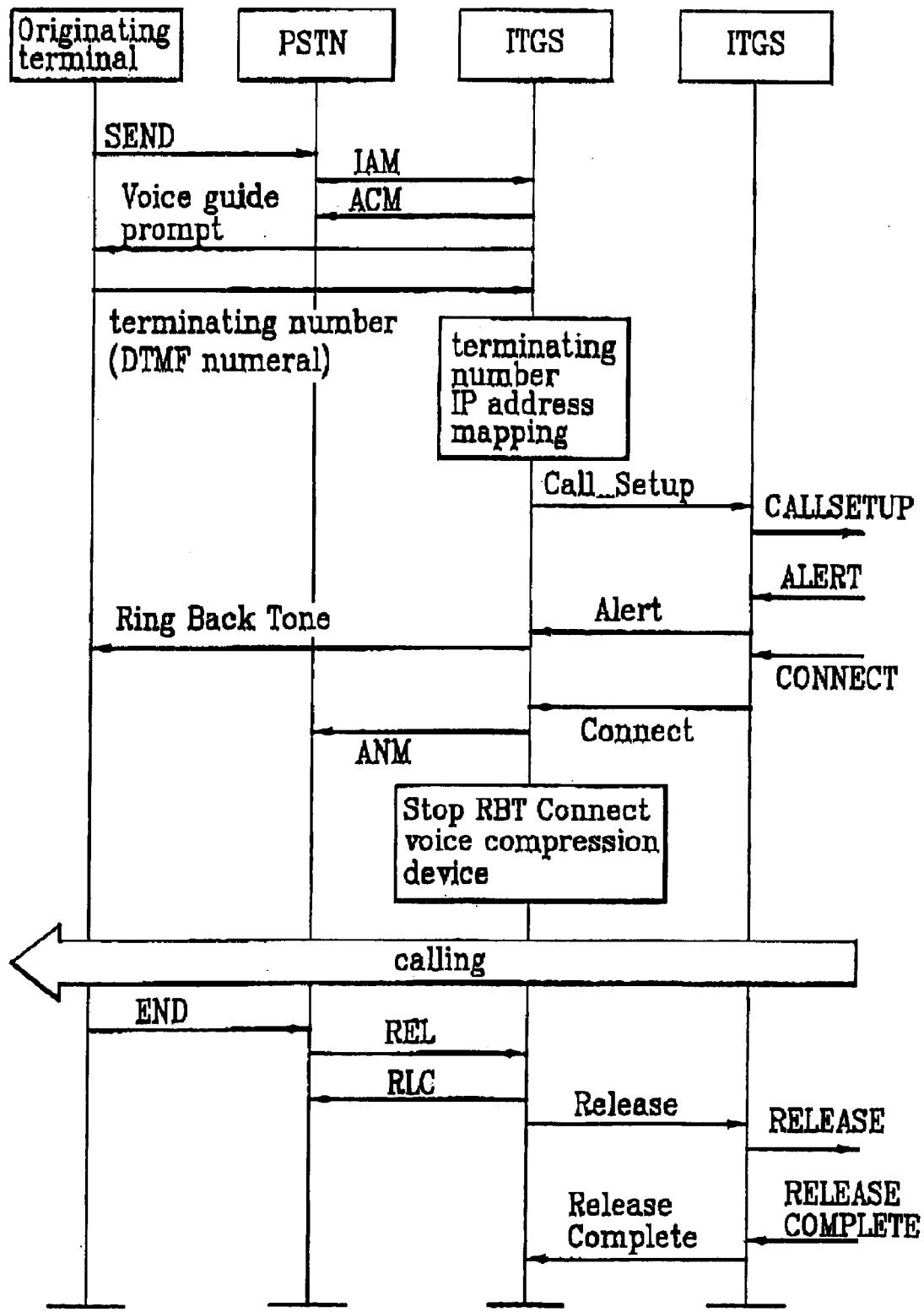
FIG. 7 is a diagram showing a protocol that restores an originating line of an incoming relay call.
Figure 8:
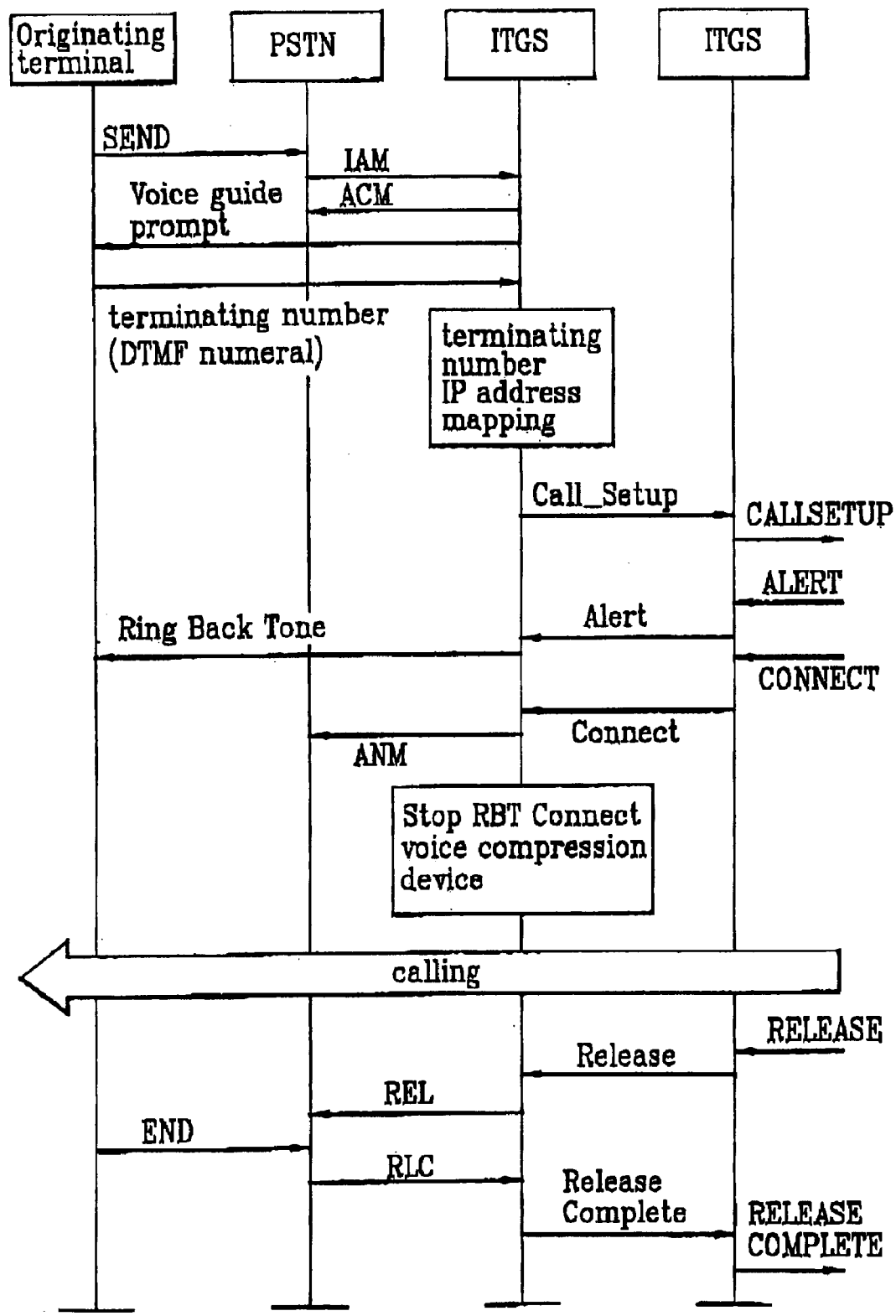
FIG. 8 is a diagram showing a protocol that restores a terminating line of an incoming relay call.
Figure 9:
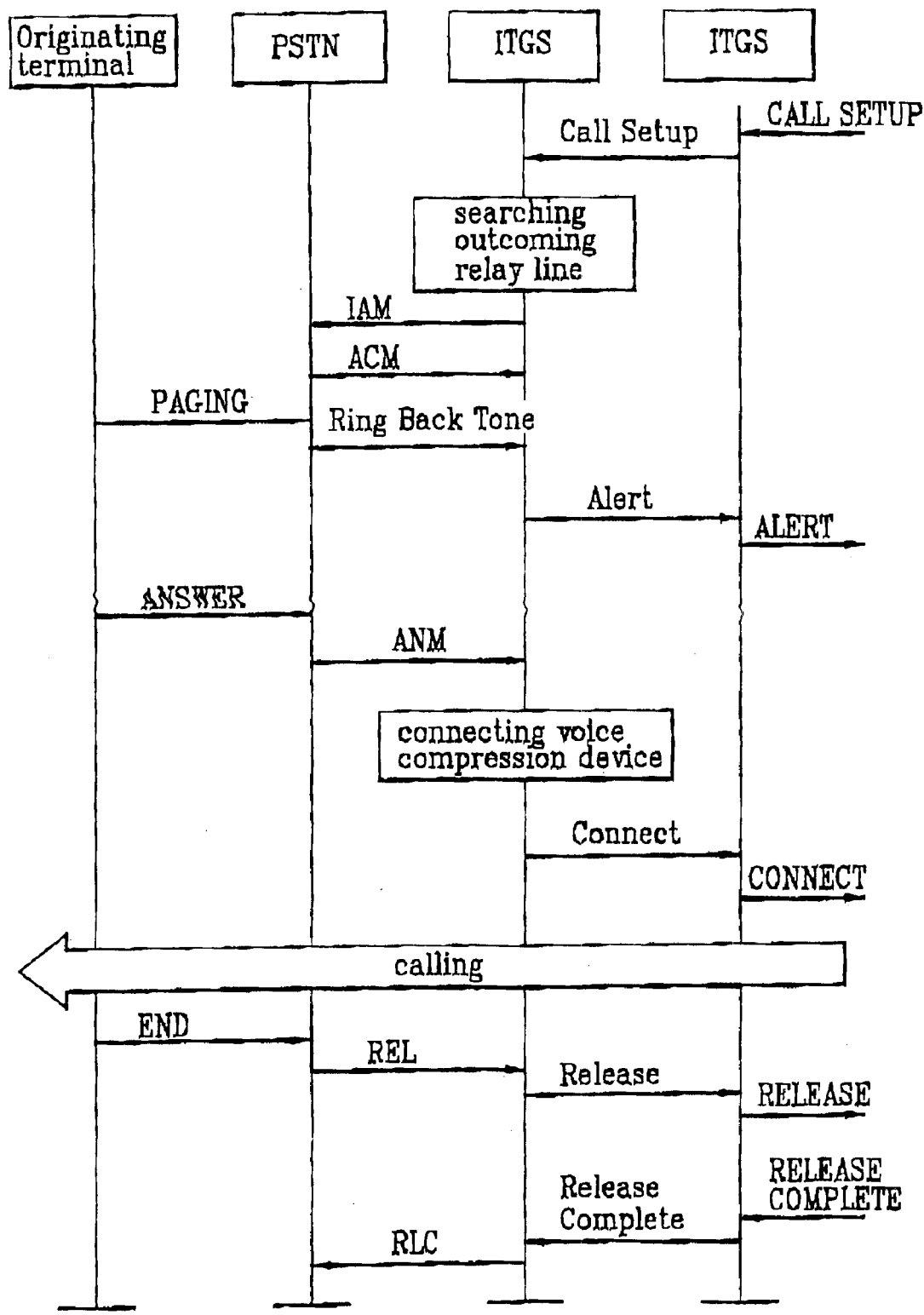
FIG. 9 is a diagram showing a protocol that restores a terminating line of an outgoing relay call.
Figure 10:
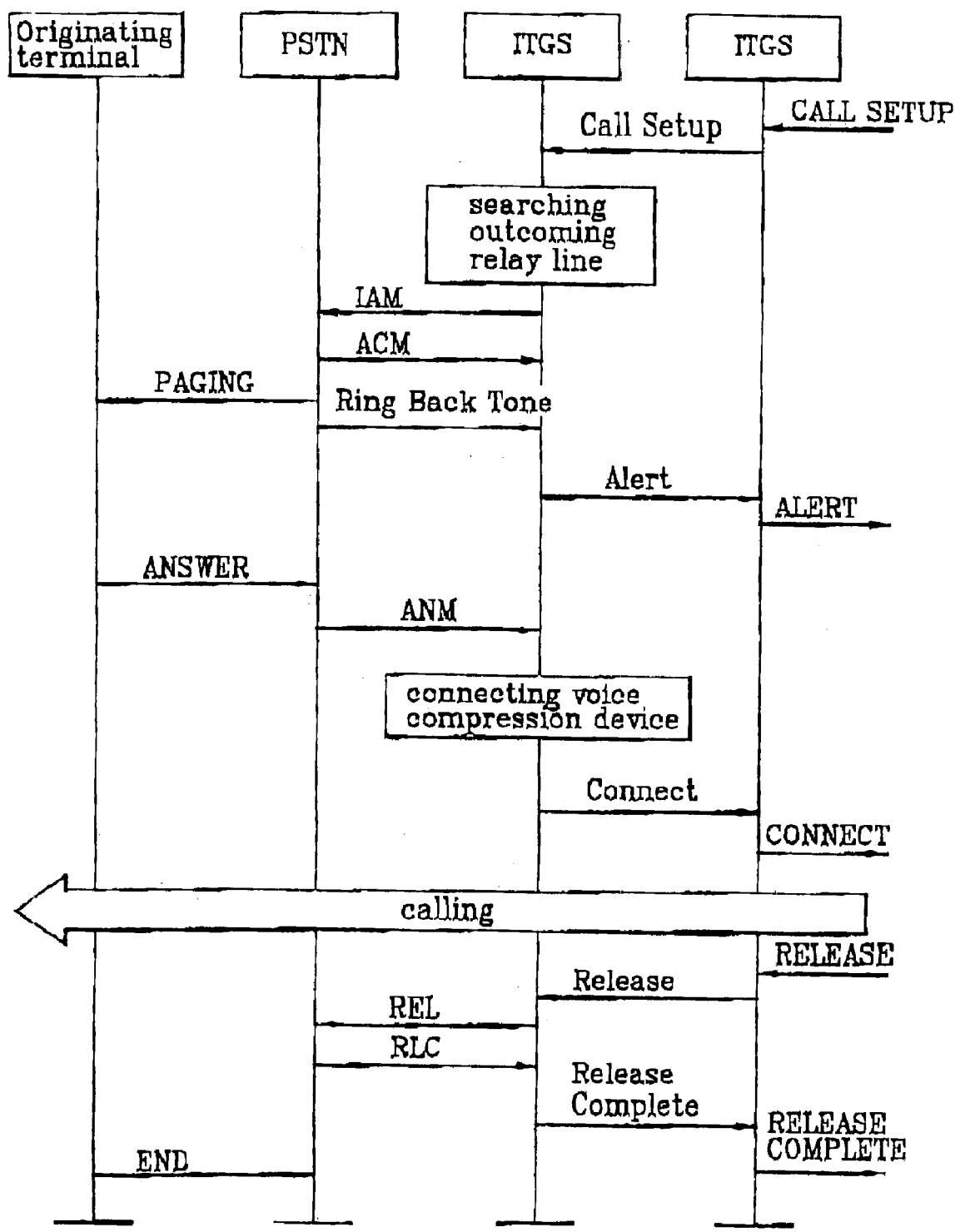
FIG. 10 is a diagram showing a protocol that restores an originating line of an outgoing relay call.
Figure 11:
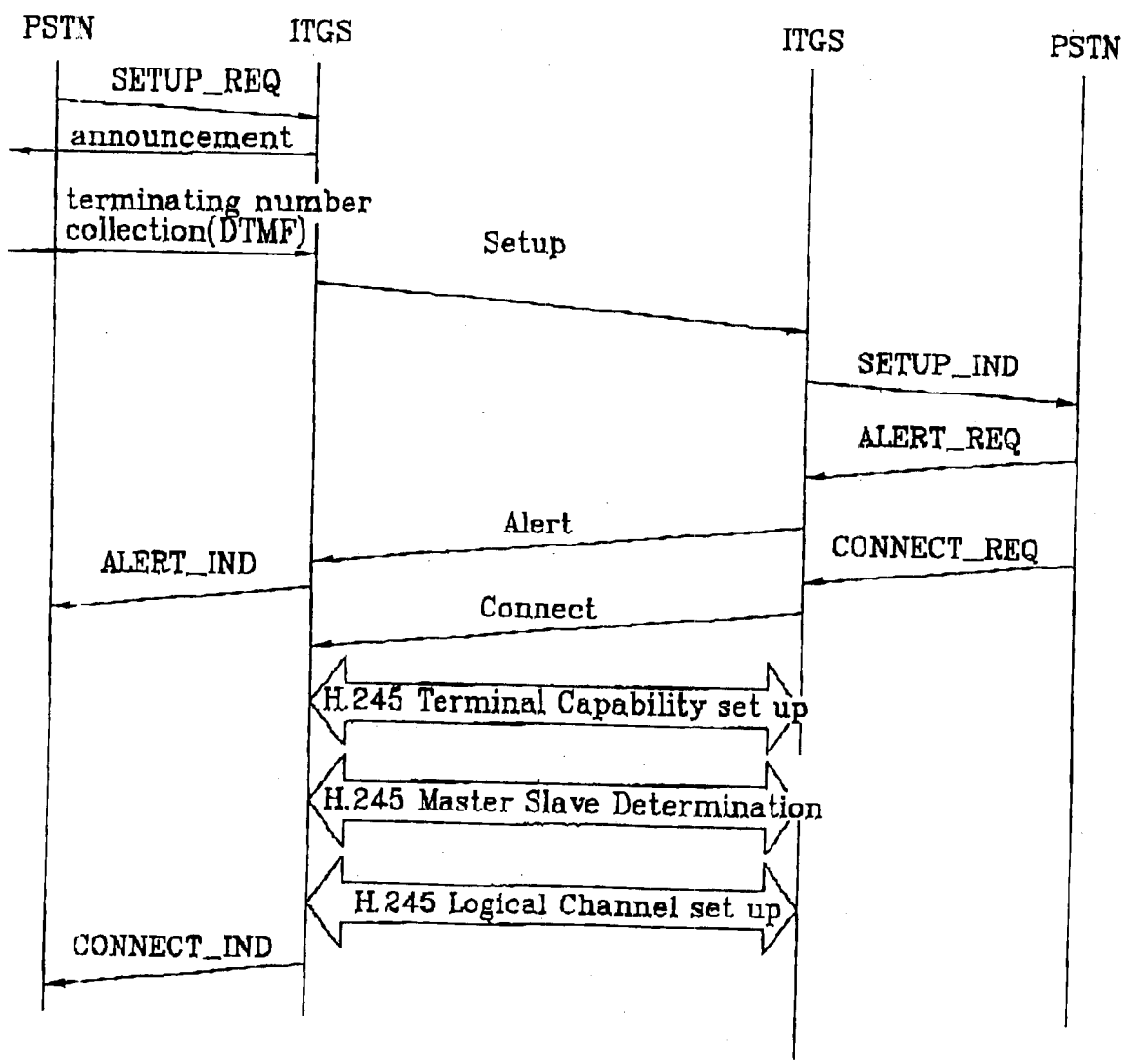
FIG. 11 is a diagram showing a protocol that sets a call between PSTNs through the Internet telephony gateway.
Figure 12:
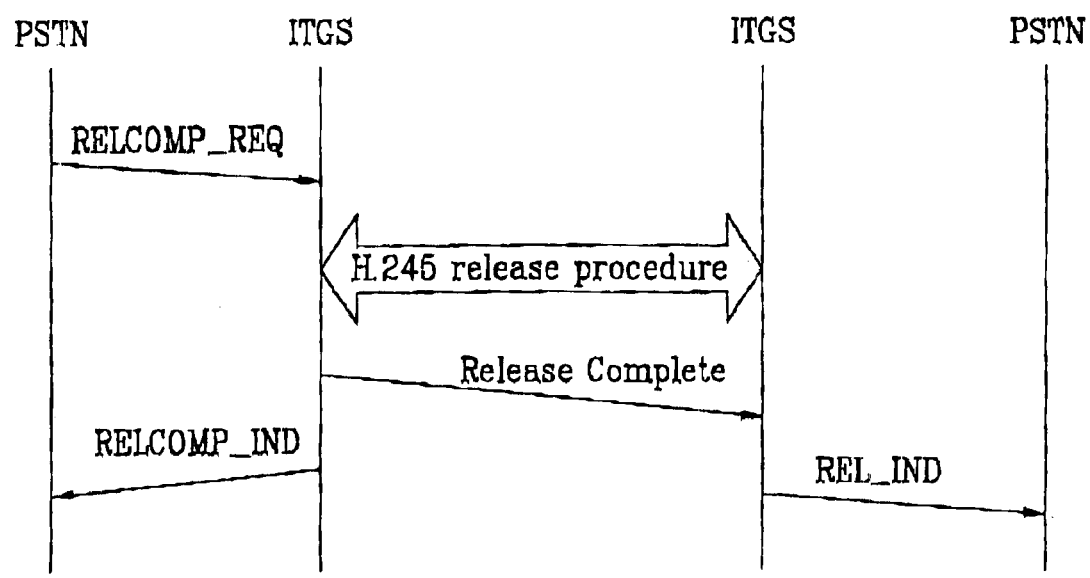
FIG. 12 is a diagram showing a protocol that releases a call between PSTNs through the Internet telephony gateway.

First, a procedure of releasing the call will be described with reference to FIG. 7.

An originating terminal unit transmits a termination signal END to the PSTN. Then, the PSTN transmits a release signal REL to the PSTN at an incoming relay call.

The Internet telephony gateway at the incoming relay call transmits a radio link control signal RLC to the PSTN in response to the release signal REL, and then transmits the release signal to the Internet telephony gateway at an outgoing relay call.

Subsequently, the Internet telephony gateway at the outgoing relay call transmits the release signal to the PSTN at the outgoing relay call.

Once a release completion signal is received from the PSTN at the outgoing relay call, the Internet telephony gateway at the outgoing relay call transmits the release completion signal to the Internet telephony gateway at the incoming relay call. Thus, a flow for the call release is completed.

As described above, the Internet telephony gateway and the method for operating an Internet telephony gateway have the following advantages.

When interruption of abnormal services due to matching between different networks occurs, the Internet telephony gateway that connects the PSTN with the IP network directly provides the call termination message, the tone, and the announcement to the corresponding subscriber terminal unit using the internal alarm system. Accordingly, the subscriber terminal unit does not have to be in standby state for a long time without any reason when interrupt of the services occurs.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications and variations will be apparent to those skilled in the art.

What is claimed is:

1. A method for operating an Internet telephony gateway comprising:

accessing a call between a terminal unit for a public switched telephone network (PSTN) and a terminal unit for an Internet protocol (IP) network;

respectively monitoring states of the PSTN and the IP network through a board for the PSTN and a board for the IP network;

generating an alarm in the board for the PSTN when any failure occurs in the PSTN, wherein generating the alarm comprises converting alarm data of a hard disk drive (HDD) module to first serial data, converting parallel input state data of a fan and cables to second serial data, converting the first and second serial data to parallel data, and adding the parallel data to state data of ejection, injection, and operation of boards, input in parallel from a printed board assembly (PBA);

blocking a channel between the Internet telephony gateway and the PSTN; and terminating the call with the terminal unit for the IP network.

2. The method of claim 1, further comprising the step of providing a sound for informing the terminal unit for the IP network of termination of the call.

3. The method of claim 2, wherein said sound includes a termination message, a tone, and an announcement.

4. A method for operating an Internet telephony gateway comprising:

accessing a call between a terminal unit for a public switched telephone network (PSTN) and a terminal unit for an Internet protocol (IP) network;

respectively monitoring states of the PSTN and the IP network through a board for the PSTN and a board for the IP network;

generating an alarm in the board for the IP network when any failure occurs in the IP network, wherein generating the alarm comprises converting alarm data of a hard disk drive (HDD) module to first serial data, converting parallel input state data of a fan and cables to second serial data, converting the first and second serial data to parallel data, and adding the parallel data to state data of ejection, injection, and operation of boards, input in parallel from a printed board assembly (PBA);

blocking a channel between the Internet telephony gateway and the IP network; and terminating the call with the terminal unit for the PSTN.

5. The method of claim 4, further comprising the step of providing a sound for informing the terminal unit for the PSTN of termination of the call.

6. The method of claim 5, wherein said sound includes a termination message, a tone, and an announcement.

7. An Internet telephony gateway comprising:

a public switched telephone network (PSTN) interface module interfacing with a PSTN and generating a failure alarm when failure occurs in the PSTN;

an Internet protocol (IP) network interface module interfacing with an IP network and generating a failure alarm when failure occurs in the IP network;

a data processing module performing a data processing procedure required for data exchange between the PSTN and the IP network; and a control module performing a flow that enables a corresponding subscriber to normally terminate a call through one network in which a failure alarm has not occurred, in response to the failure alarm that may occur in either the PSTN or the IP network, each of said PSTN interface module and said IP network interface module comprising:

a printed board assembly (PBA) providing alarm data of the PSTN and the IP network;

a first parallel-to-serial converter converting alarm data of a hard disk drive (HDD) module to serial data;

a second parallel-to-serial converter converting parallel input state data of a fan and cables to serial data;

a serial-to-parallel converter converting the data from the first and second parallel-to-serial converters to parallel data, and adding the parallel data to state data of ejection, injection, and operation of boards, input in parallel from the PBA;

a memory storing the data output from the serial-to-parallel converter in corresponding addresses; and a data bus buffer transmitting the state data stored in the memory to the system module so as to monitor the failure.

8. An Internet telephony gateway comprising:
a public switched telephone network (PSTN) interface module interfacing with a PSTN and generating a failure alarm when failure occurs in the PSTN;
an Internet protocol (IP) network interface module interfacing with an IP network and generating a failure alarm when failure occurs in the IP network;
a data processing module performing a data processing procedure required for data exchange between the PSTN and the IP network; and
a control module performing a flow that enables a corresponding subscriber to normally terminate a call through one network in which a failure alarm has not occurred, in response to the failure alarm that may occur in either the PSTN or the IP network, each of said PSTN interface module and said IP network interface module comprising:
a printed board assembly (PBA) providing alarm data of the PSTN and the IP network, wherein the failure alarm data are collected in a port scan bit (PSB) memory in injection bit types from said PBA;
a first parallel-to-serial converter converting alarm data of a hard disk drive (HDD) module to serial data;
a second parallel-to-serial converter converting parallel input state data of a fan and cables to serial data;
a serial-to-parallel converter converting the data from the first and second parallel-to-serial converters to parallel data, and adding the parallel data to state data of ejection, injection, and operation of boards, input in parallel from the PBA;
a memory storing the data output from the serial-to-parallel converter in corresponding addresses; and
a data bus buffer transmitting the state data stored in the memory to the system module so as to monitor the failure.

9. A network-based telephony method, said method comprising:
providing a plurality of call signaling channels between a public switched telephone network (PSTN) and an Internet protocol network (IPN);
managing the state of said plurality of call signaling channels between said PSTN and said IPN by way of at least one call control module;
reporting IPN call signaling channel failures to said at least one call control module, wherein reporting the call signal channel failures comprises converting alarm data of a hard disk drive (HDD) module to first serial data, converting parallel input state data of a fan and cables to second serial data, converting the first and second serial data to parallel data, and adding the parallel data to state data of ejection, injection, and operation of boards, input in parallel from a printed board assembly (PBA); and
utilizing said at least one call control module to block a corresponding failed IPN call signaling channel and terminate the call through the PSTN.

10. The network-based telephony method of claim 9, further comprising the step of providing a terminal unit connected to said PSTN with an indication of the termination of the call.

11. The network-based telephony method of claim 10, wherein said call termination indication includes a call termination message.

12. The network-based telephony method of claim 10, wherein said call termination indication includes a tone.

13. A network-based telephony method, said method comprising:
providing a plurality of call signaling channels between a public switched telephone network (PSTN) and an Internet protocol network (IPN);
managing the state of said plurality of call signaling channels between said PSTN and said IPN by way of at least one call control module;
reporting PSTN call signaling channel failures to said at least one call control module, wherein reporting call signal channel failures comprises converting alarm data of a hard disk drive (HDD) module to first serial data, converting parallel input state data of a fan and cables to second serial data, converting the first and second serial data to parallel data, and adding the parallel data to state data of election, injection, and operation of boards, input in parallel from a printed board assembly (PBA); and
utilizing said at least one call control module to block a corresponding failed PSTN call signaling channel and terminate the call through the IPN.

14. The network-based telephony method of claim 13, further comprising the step of providing a terminal unit connected to said IPN with an indication of the termination of the call.

15. The network-based telephony method of claim 14, wherein said call termination indication includes a call termination message.

16. The network-based telephony method of claim 14, wherein said call termination indication includes a tone.

17. The network-based telephony method of claim 14, wherein said call termination indication includes an announcement.

18. A network-based telephony gateway comprising:
at least one call control module;
at least one public switched telephone network (PSTN) interface operatively coupled between said at least one control module and at least one PSTN;
at least one Internet protocol network (IPN) interface operatively coupled between said at least one control module and at least one IPN; and
means for exchanging data between said at least one PSTN interface and said at least one IPN interface,
said at least one call control module managing the state of call signaling channels between said at least one PSTN and said at least one IPN,
said at least one PSTN interface adapted to report PSTN call signaling channel failures to said at least one call control module,
said at least one IPN interface adapted to report IPN call signaling channel failures to said at least one call control module,
said at least one call control module adapted to block a corresponding failed PSTN call signaling channel and terminate the call through said at least one IPN,
said at least one call control module further adapted to block a corresponding failed IPN call signaling channel and terminate the call through said at least one PSTN,
and wherein the at least one PSTN interface and the at least one IPN interface comprise a printed board assembly (PBA) providing alarm data of the at least one PSTN and the at least one IPN, a first parallel-to-serial converter converting alarm data of a hard disk drive (HDD) module to serial data, a second parallel-to-serial converter converting parallel input state data of a fan and cables to serial data, and a serial-to-parallel converter converting the data from the first and second parallel-to-serial converters to parallel data, and adding the parallel data to state data of ejection, injection, and operation of boards, input in parallel from the PBA.

19. The network-based telephony gateway of claim 18, wherein said at least one call control module comprises a call maintenance module and a call processing module, said call maintenance module adapted to provide call signaling channel maintenance data to said call processing module, said call processing module adapted to periodically update the state of call signaling channels between said at least one PSTN and said at least one IPN according to call signaling channel maintenance data received from said call maintenance module.

20. The network-based telephony gateway of claim 19, wherein the state of call signaling channels includes an "idle" state, a "conversation busy" state, a "block" state, and a "not-assign" state.

* * * * *